(12) United States Patent
Romagny et al.

(10) Patent No.: US 7,535,143 B2
(45) Date of Patent: May 19, 2009

(54) ELECTROMAGNETIC COUPLER

(75) Inventors: Paul Alex Romagny, Bois d'Arcy (FR); Armando Fonseca, Voisins le Bretonneux (FR)

(73) Assignee: Renault S.A.S., Boulogne Billancourt (FR)

( * ) Notice: Subject to any disclaimer, the term of this patent is extended or adjusted under 35 U.S.C. 154(b) by 184 days.

(21) Appl. No.: 10/587,853

(22) PCT Filed: Jan. 31, 2005

(86) PCT No.: PCT/FR2005/050057

§ 371 (c)(1), (2), (4) Date: Jan. 11, 2007

(87) PCT Pub. No.: WO2005/076443

PCT Pub. Date: Aug. 18, 2005

(65) Prior Publication Data

US 2007/0096574 A1    May 3, 2007

(30) Foreign Application Priority Data

Jan. 29, 2004    (FR) .................................. 04 00830

(51) Int. Cl.
*H02K 16/00* (2006.01)
*H02K 49/02* (2006.01)
*F16D 27/00* (2006.01)

(52) U.S. Cl. ..................... 310/114; 310/112; 310/266

(58) Field of Classification Search ......... 310/112–114, 310/265–266, 156.02; 318/730; 464/29; 192/84.2, 84.21
See application file for complete search history.

(56) References Cited

U.S. PATENT DOCUMENTS

| 4,973,868 A | * | 11/1990 | Wust ........................... 310/51 |
| 5,783,893 A | * | 7/1998 | Dade et al. .................. 310/266 |
| 6,380,653 B1 | | 4/2002 | Seguchi | |

FOREIGN PATENT DOCUMENTS

| AU | 58401/73 | 1/1975 |
| DE | 11 10 293 | 7/1961 |
| DE | 21 46 798 | 3/1973 |
| FR | 1 188 200 | 9/1959 |

\* cited by examiner

*Primary Examiner*—Burton Mullins
(74) *Attorney, Agent, or Firm*—Oblon, Spivak, McClelland, Maier & Neustadt, P.C.

(57) ABSTRACT

An electromagnetic coupler for a motor vehicle. The coupler includes a first electric machine having an axis and including a first stator bearing a first coil, an input rotor and a first part of an output rotor, and a second electric machine including a second stator bearing a second coil and a second part of the output rotor. The input rotor includes an inner drum spaced apart from the first part of the output rotor and from the first yoke, while the second yoke is spaced apart from the second part of the output rotor by an air gap. The first coil is wound onto the yoke of the first stator around the axis of the first electric machine.

22 Claims, 9 Drawing Sheets

BACKGROUND ART

ELECTROMAGNETIC COUPLER

BACKGROUND OF THE INVENTION

I. Field of the Invention

The present invention relates to an electromagnetic coupler.

II. Description of Related Art

In its application to a vehicle, an electromagnetic coupler can be used for example to transmit mechanical power between an internal combustion engine and the wheels of the vehicle, by adjusting at will and continuously the torque and the speed on the latter. It can also be used, where appropriate, to provide a motive or generative electromechanical energy conversion in conjunction with electrical energy storage means. It can therefore be particularly useful in transmissions or hybrid electrical traction systems of motor vehicles.

As shown in FIG. 1, an electromagnetic coupler 10 conventionally comprises:
- an input shaft 12 intended to be mechanically coupled to a motive source,
- an output shaft 14 intended to be mechanically coupled to at least one element to be driven,
- a casing 16,
- and two electrical machines.

The first electrical machine M1 comprises in this illustration:
- an input rotor 20, having an axis A, driven rotation-wise by the input shaft 12 and comprising a first armature 22 and
- a crown 23 of inner magnets 24 magnetically coupled with the first armature 22 and borne by an output rotor 30 of axis A mounted to rotate on the casing 16 and in a mechanical drive relationship with the output shaft 14.

The first armature 22 has windings 52 installed in its magnetic circuit 60, and electrically connected to an electrical power source, conventionally one or more batteries 32, via a first electronic unit 34.

Conventionally, the first electronic unit 34 is modeled to transform the direct current output from the battery 32 into a polyphase current, the phases of which feed the windings of the first armature 22, and vice versa. The windings of the first armature 22 are distributed in a known manner around the periphery of the input rotor 20 so that the polyphase current circulating there can generate a first rotating electromagnetic field.

The first electronic unit 34 is driven by a driver unit 36 designed to allow for control of the "slip", that is, the difference between the rotation speeds of the input rotor 20 and the output rotor 30, in particular by modifying the frequency of the electric current. Depending on whether the slip is positive or negative, the first armature 22 can be generator or receiver, that is, the transfer of energy between the output shaft 14 and the battery 32 is in the direction of a charge or a discharge of that battery, respectively. This additive or subtractive transfer of energy is reflected in a variation of the rotation speed of the output shaft 14.

In synchronism, that is, at zero slip speed, the input 12 and output 14 shafts are linked as they would be by a direct mechanical coupling, the first armature 22 then receiving only the electrical power needed for magnetization, that is, a direct current.

The second electric machine M2 comprises:
- a second machine stator 40, fixed to the casing 16 and bearing a second armature 42 comprising a plurality of coils 100 installed in its magnetic circuit 43, and
- a crown 44 of outer magnets 45 of the output rotor 30 with which the second armature 42 is magnetically coupled.

The coils of the second armature 42 are fed with polyphase current via a second electronic unit 46 connected to the battery 32 so as to generate a second rotating electromagnetic field.

The driver unit 36 controls the second electronic unit 46 to control the additive or subtractive torque introduced by the machine M2 on the rotor 30 and therefore the output shaft 14.

Conventionally, the magnets of the crowns 23 and 44 can, for example, be replaced by an asynchronous squirrel cage, or even by teeth with reluctance, the design of the first and second corresponding armatures being adapted accordingly.

Conventionally, the driver unit 36 controls the electronic units 34 and 46 according to angular position information concerning the input 20 and output 30 rotors, and settings typically supplied by the driver of the vehicle.

The position information can be supplied by position encoders, not shown, or deduced from other measurements.

The two electric machines can cooperate so that the electrical power derived from the slip of the first machine is used by the second electric machine to produce an additional mechanical torque on the shaft 14.

Patent AU 5840173 describes various embodiments of electromagnetic couplers.

By acting on both electric machines, it will be understood that it is thus possible to adapt the transmission speed- and torque-wise at will and, where appropriate, exploit the potential of an electric energy storage.

The electrical energy supply for the first armature 22 conventionally requires sliding electric contacts 48 between the first fixed electronic unit 34 and the rotating windings of the first armature 22. The sliding contacts 48 represent a topological integration constraint, volume-wise, in terms of compatibility with the physical environment and reliability. They also constitute a not inconsiderable cost center.

To avoid such sliding contacts, U.S. Pat. No. 6,380,653 discloses an electromagnetic coupler in which the first armature 22 comprises a first machine stator, or "first stator 50" having an axis A, that is fixed, and bearing coils 52 (see FIG. 2) and an input rotor 20 without windings, made of a cylindrical support provided with peripheral ferromagnetic studs. The stator 50, fixed to the casing 16, is concentric to the input rotor 20 and radially separated from the latter by an additional air gap 54. The coils 52 of the first armature 22 are conventionally introduced into longitudinal peripheral notches, that is, notches extending along the axis A, provided on the surface of the first stator 50, according to the normal method of producing polyphase machine armatures.

The coupler disclosed in U.S. Pat. No. 6,380,653 does, however, have a large footprint. Furthermore, its operation generates high Joule losses.

BRIEF SUMMARY OF THE INVENTION

There is therefore a need for an electromagnetic coupler that does not present these drawbacks. There is also an ongoing need for an electromagnetic coupler that is simpler and less expensive to produce.

The aim of the invention is to provide an electromagnetic coupler capable of satisfying these requirements.

According to the invention, this aim is achieved by means of an electromagnetic coupler, in particular for a motor vehicle, comprising
- a first electric machine comprising a first stator having an axis A bearing at least one first coil wound on a first fixed yoke, and capable of being coupled by magnetic induction with a first part of an output rotor mobile rotation-wise about the axis A relative to said first stator, said coupling being provided via an inner drum, mobile rotation-wise about the axis A relative to said first stator and to said first part and spaced apart from said first part and from said first yoke by a first air gap and an additional air gap, respectively, a second electric machine having an axis A comprising a second stator bearing at least one second coil wound on a "second yoke" in the form of a second magnetic circuit or of a yoke, and capable of being coupled by magnetic induction with a second part of said output rotor via a second air gap.

The inventive electromagnetic coupler is noteworthy in that said first coil is wound on said first yoke about said axis A of said first stator.

As will be seen in greater detail later in the description, the inventive electromagnetic coupler allows for a good electromagnetic use of the space and for a major improvement on Joule losses in the winding of the first armature, losses that are a major issue in terms of both heat and energy consumption.

According to other preferred characteristics of the invention, said first yoke is roughly annular having an axis A and has a U-shaped transverse cross section, the first and second flanges of said first yoke being terminated by first and second surfaces spaced apart from said inner drum by said additional air gap;

said first coil is wound in a groove of said first yoke and does not project outside of said groove;

said second coil, annular, is wound, about the axis A, preferably in a groove of said second yoke without projecting outside of said groove;

said second yoke is roughly annular having an axis A and presents a U-shaped transverse cross section in which the first and second flanges have a regularly crenellated profile;

or, as a variant, said second yoke is roughly annular having an axis A and presents a U-shaped transverse cross section, the first and second flanges of said second yoke being extended by first and second sets of prongs, respectively, disposed alternately, without contact with each other, in line with and spaced apart from said second part of said output rotor by said second air gap;

said input and output rotors are inserted into each other;

said input rotor is at least partly covered by a binding band made of a magnetic material of type Fe-17.5Cr-0.5C;

said binding band is produced by edge rolling a sheared strip of said magnetic material or by flat spiral winding a sheet of said magnetic material, the turns of said winding being electrically insulated from each other;

said electromagnetic coupler comprises first and second adjacent wafers, each comprising at least one first coil wound, about the axis A, on a first fixed yoke, said first yokes of first and second wafers being separated by a magnetic decoupling space;

said electromagnetic coupler comprises first and second adjacent wafers and said output rotor comprises a magnetic decoupling space disposed between said first and second wafers, in a plane roughly perpendicular to the axis A;

a cooling circuit is disposed in said decoupling space;

said second part of said output rotor comprises an outer crown of magnetic studs, in line with and spaced apart from said first and second flanges of said second yoke by said second air gap.

According to other preferred characteristics of a first embodiment of the invention, said inner drum comprises first and second coaxial plates of axis A, drilled in their centers by first and second holes bounded by first and second inner surfaces, respectively, and bearing first and second sets of prongs extending around the periphery of said first and second plates, respectively, said first and second plates being modeled and arranged relative to each other so that the prongs of said first and second plates are disposed alternately, without contact between each other, in line with and spaced apart from said first part of said output rotor, said first and second inner surfaces being in line with and spaced apart from said first and second flanges of said first yoke, respectively;

said first part of said output rotor comprises a crown of inner magnets, radially magnetized, with alternate polarities, and disposed in line with and spaced apart from said prongs;

said second part of said output rotor comprises a crown of outer magnets in line with and spaced apart from said second yoke;

the number of said outer magnets is equal to the number of said inner magnets, said outer and inner magnets being disposed with the same direction of magnetization;

said binding band presents, above an area separating two so-called adjacent prongs, an electromagnetic permeability less than that which it presents above said adjacent prongs;

said first yoke and/or said first plate and/or said second plate are made of a composite magnetic material of the "iron powder" type, or "Soft Magnetic Composites".

According to other preferred characteristics of a second embodiment of the invention, said inner drum comprises first and second toothed crowns, coaxial with axis A, drilled in their centers by first and second holes bounded by first and second inner surfaces, respectively, and bearing first and second sets of teeth, respectively, said first and second toothed crowns being modeled and arranged relative to each other so that the teeth of said first and second toothed crowns are disposed in line with and spaced apart from said first part of said output rotor, said first and second inner surfaces being in line with and spaced apart from said first and second flanges of said first yoke, respectively;

said first part of said output rotor comprises an inner crown of magnetic studs in line with and spaced apart from said teeth;

said inner crown comprises as many magnetic studs as said first toothed crown or said second toothed crown has teeth;

said magnetic studs extend axially so as to be able to simultaneously cover, at least partly, a tooth of each of said first and second toothed crowns.

BRIEF DESCRIPTION OF THE DRAWINGS

Other characteristics and advantages of the present invention will become apparent from reading the description that follows and from an examination of the appended drawings in which.

DETAILED DESCRIPTION OF THE INVENTION

In the figures, identical references have been used to denote identical or similar devices.

Figure 1:
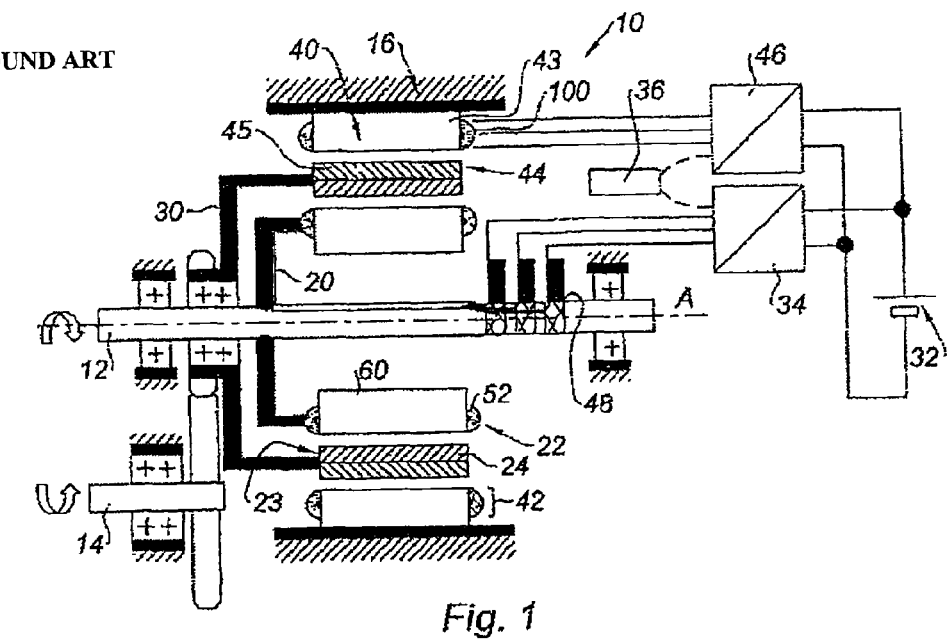
FIG. 1 diagrammatically represents an electromagnetic coupler according to the prior art.
Figure 2:
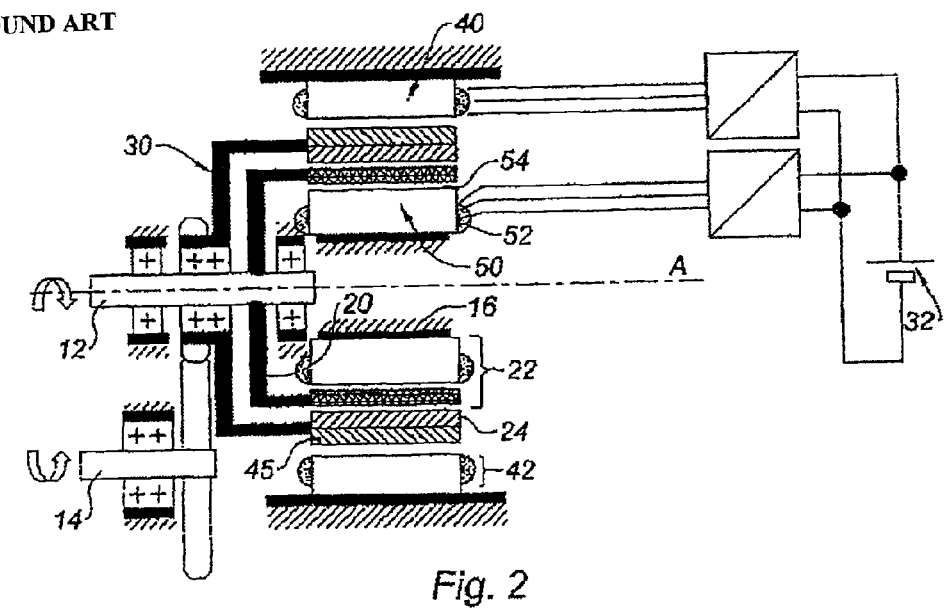
FIG. 2 diagrammatically represents an electromagnetic coupler according to U.S. Pat. No. 6,380,653.
Figure 3:
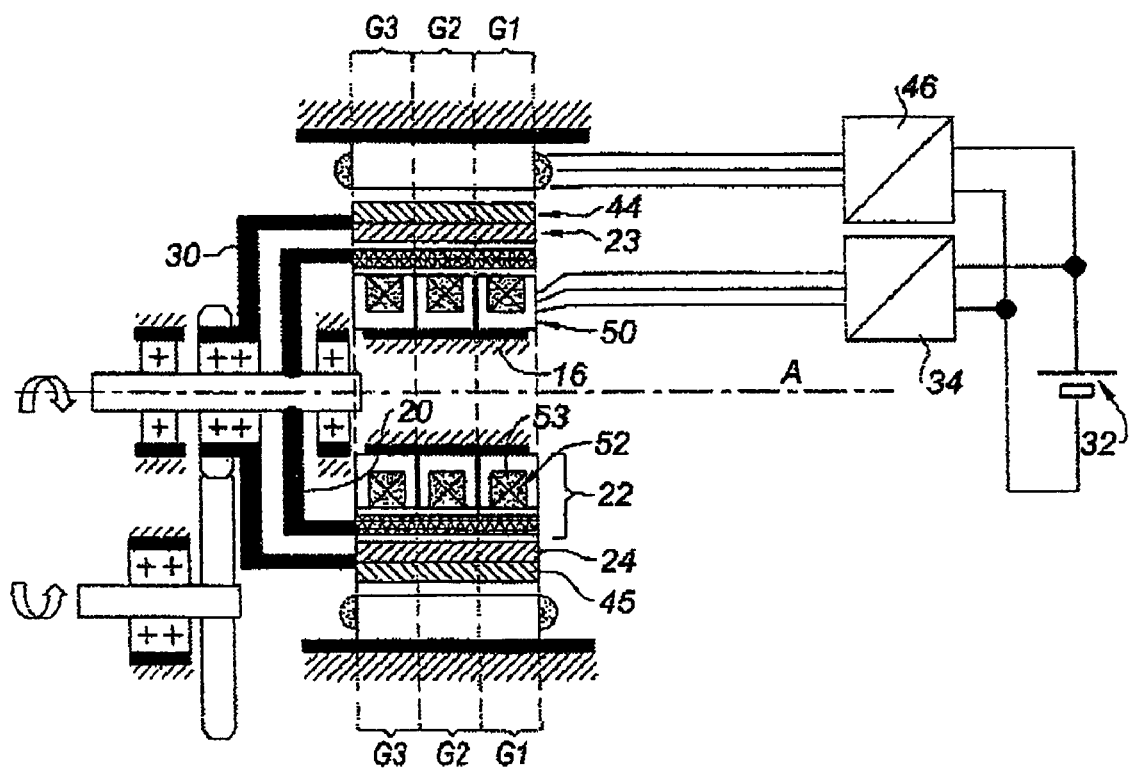
FIG. 3 diagrammatically represents an electromagnetic coupler according to the invention.

FIGS. 1 and 2 were described in the introduction, so reference is now made to FIG. 3.

The inventive electromagnetic coupler represented in FIG. 3 comprises for its electrical machine M1, three wafers G1, G2 and G3, that is, three units operating in a similar way and cooperating with each other according to electromagnetic currents feeding the coils of the armatures that they include. The wafers G1, G2 and G3 in this case form a three-phase system; since their operation is similar, only the first wafer G1 is described below in detail.

The first electric machine M1, having an axis A, comprises a first stator 50, having an axis A, fixed to the casing 16. According to the invention, a so-called "centralized annular" coil 52 is wound on a yoke 60 of the first stator 50 or "first yoke 60", about the axis A. Since the yoke 60 is fixed to the casing 16, electrical power supply to the coil 52 is advantageously possible without sliding contact.

The first yoke 60, roughly annular, comprises an annular groove, open radially towards the axis A, with a U-shaped transverse cross section. The groove of the first yoke 60 thus delimits a bottom 61 and first and second yoke flanges, 62 and 64, formed by the two branches of the "U". The flanges 62 and 64 extend roughly perpendicularly to the axis A and are terminated by first and second roughly cylindrical surfaces 66 and 68, respectively, having an axis A (see FIG. 6).

Figure 4:
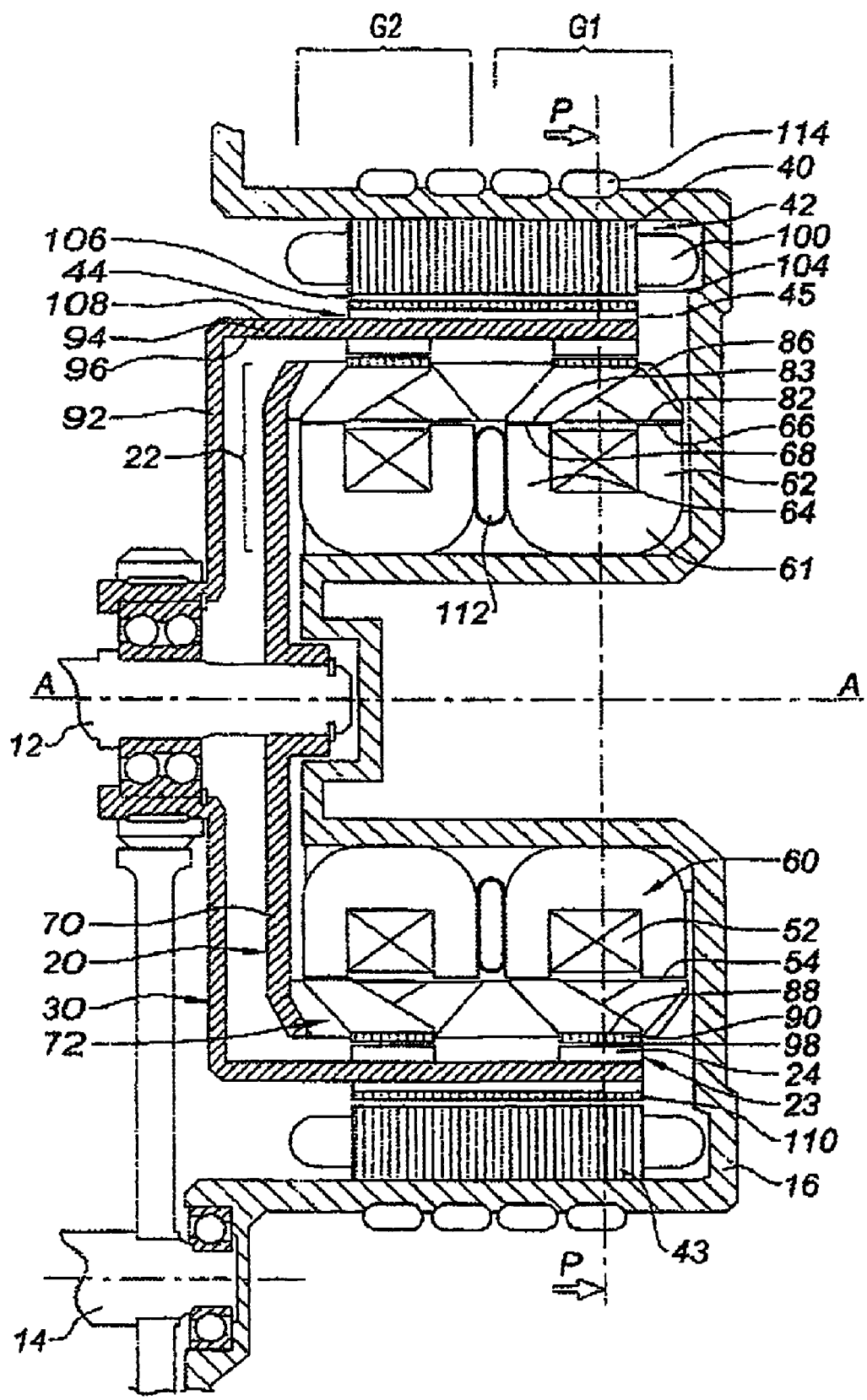
FIGS. 4 and 5 diagrammatically represent, in a two-phase configuration with two wafers, an electromagnetic coupler according to a first embodiment of the invention, in cross section in the plane of the drawing in FIG. 3, and in quarter section according to the plane P-P of FIG. 4, respectively.
Figure 5:
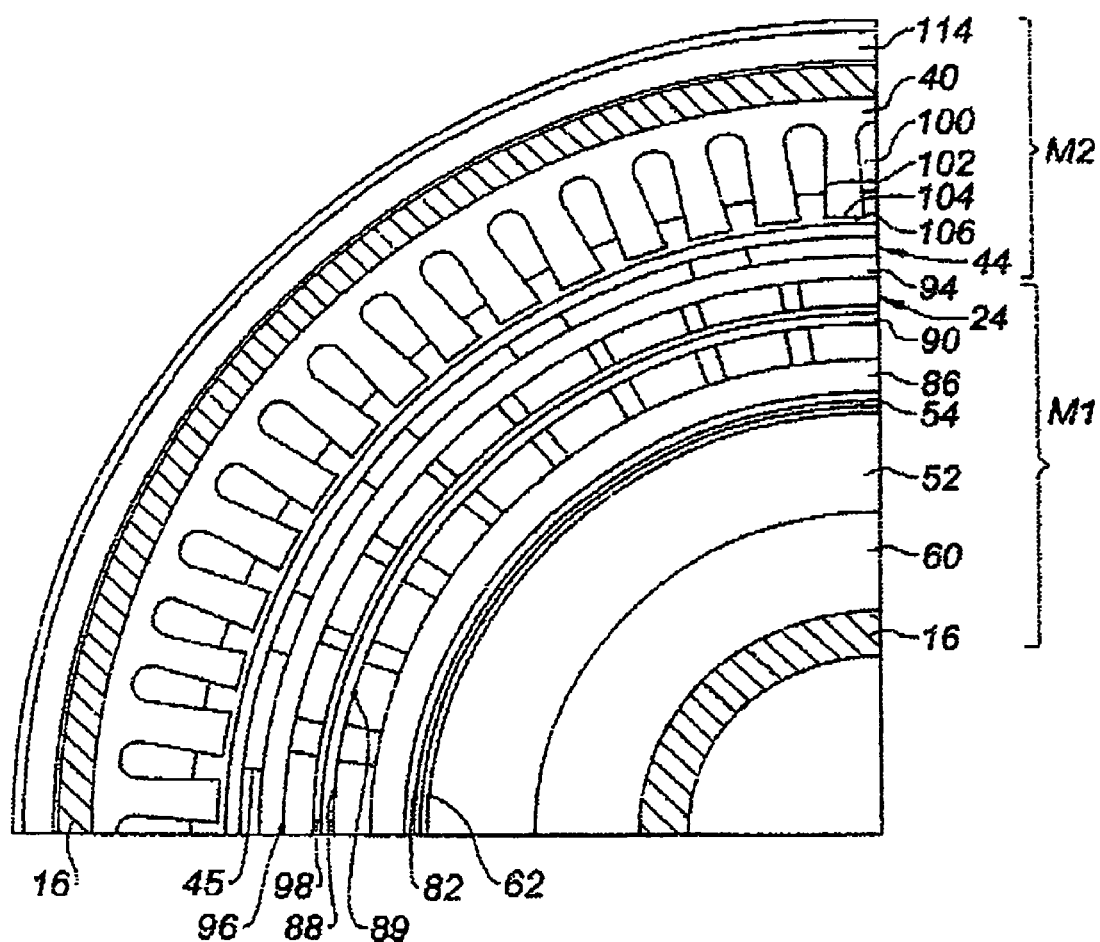
Figure 6:
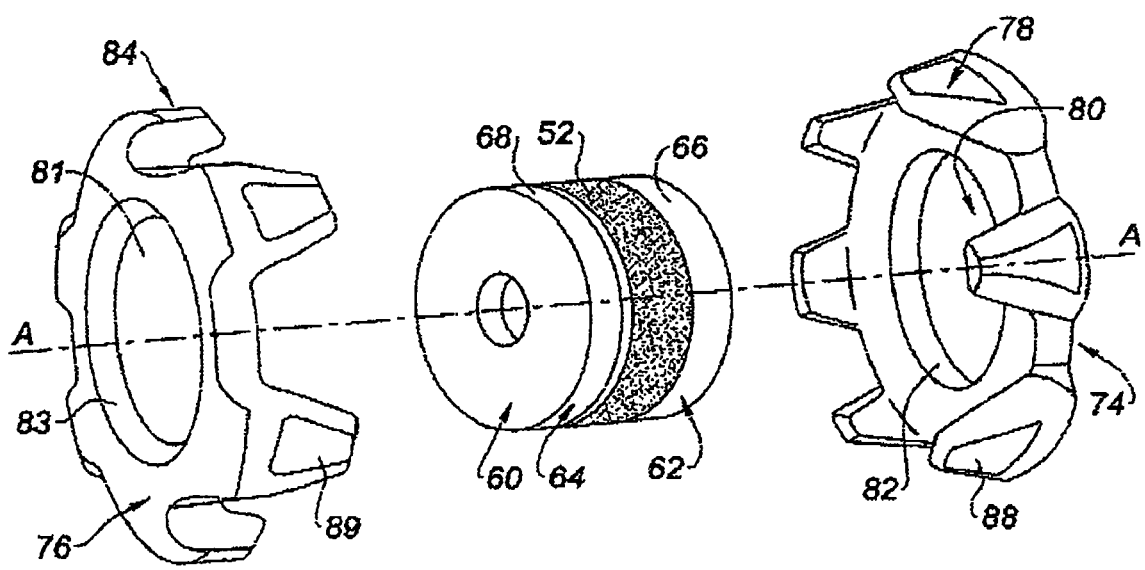
FIG. 6 represents an exploded view, in perspective, of a part of the electromagnetic coupler represented in FIGS. 4 and 5.

As shown in FIGS. 4, 5 and 6, the annular coil 52 is wound in the groove of the first yoke 60, the turns of the coil 52 preferably not projecting outside said groove.

The input rotor 20, mounted rotation-wise according to the axis A on the casing 16, comprises a disk-shaped support 70, fixed at its center and perpendicularly to the axis A on the input shaft 12 (FIG. 4) and an inner drum 72, having an axis A, fixed to the periphery of the support 70. The inner drum 72 is common to the different wafers. For each wafer, it incorporates first and second pronged plates 74 and 76, respectively, roughly of the same shape, as shown in FIG. 6.

The first and second plates, 74 and 76 respectively, are disk shaped of axis A, drilled in their respective centers by first and second holes, 80 and 81 respectively, that are roughly circular. The edges of the holes 80 and 81 delimit first and second inner surfaces, 82 and 83 respectively, cylindrical and in line with the first and second cylindrical surfaces, 66 and 68 respectively, of the first and second flanges, 62 and 64 respectively, of the first yoke 60. The additional air gap 54 radially separates the first and second inner surfaces, 82 and 83 respectively, on the one hand, and the first and second cylindrical surfaces, 66 and 68 respectively, on the other hand.

The first and second plates, 74 and 76 respectively, bear first and second sets of prongs having the same number of prongs. The terms "first prongs 78" and "second prongs 84" are used to denote the prongs of the first and second sets respectively. The prongs 78 and 84 extend roughly perpendicularly to the plates 74 and 76.

The first and second plates, 74 and 76 respectively, are nested in each other so that the first and second outer lateral sides, 88 and 89 respectively, of said first and second prongs, respectively, extend alternately, but without contact with each other, at the periphery of a cylindrical portion of the inner drum 72, facing the inner magnets 24 borne by the output rotor 30.

Preferably, the angular spacing between two successive prongs is roughly constant.

The plates 74 and 76 are kept joined to each other and to the support 70 by means of a non-magnetic binder 86, for example a plastic overmolding.

The yoke 60 and the plates 74 and 76 are made of a magnetically conductive material, preferably electrically resistive. In practice, in the slip-mode operating phases of the electromagnetic coupler, the fluxes that circulate in these parts are alternating, and therefore generate eddy currents.

The traditional "laminate" solution obtained by juxtaposing magnetic plates is possible, but not very effective because of the three-dimensional circulation of the magnetic flux in the yoke 60 and the plates 74 and 76. This is why, preferably, the yoke 60 and the plates 74 and 76 are made of an "iron powder" type Soft Magnetic Composites (SMC) material, such as those available for example from Höganäs in Sweden or Quebec Metal Powder in Canada.

To facilitate manufacture, in particular in the case of large scale constructions, the parts made of SMC "iron powder" can be segmented into smaller elements for subsequent assembly. Advantageously, the good tolerances obtained in forming SMC parts normally eliminate the need for any further machining.

As will be seen in greater detail in the description below, the lateral sides 88 and 89 are intended to form, under the effect of the magnetic field generated by the coil 52, magnetic poles of opposing polarities.

The low relative slip speeds between the input and output rotors that often characterize most operating cases of the coupler, and the use of "iron powders" that allow for operation at high frequencies, make it possible to multiply the number of poles. Advantageously, the performance levels in terms of high torque per unit of volume of the structures with centralized armature are therefore well exploited.

Preferably, the outer lateral sides 88 and 89 of the prongs 78 and 84 are circled by a binding band 90, which, advantageously, allows the input rotor 20 to rotate at high speeds.

For this binding band, solutions that are already known can be used, for example the solutions applied to machines with surface magnets where there is a need to avoid having the air gap contain both electrical conductive materials and materials that can induce magnetic short circuits (recourse to carbon fibers, etc.). These solutions do, however, present the drawback of significantly increasing the air gap reluctance.

Preferably, the binding band 90 is made of a magnetic material of Fe-17.5CR-0.5C composition, typically of type "YEP-FA1" marketed by Hitachi. This material has a magnetic permeability of approximately 900 which can be reduced to less than 1.01 after local heat treatment.

The binding band 90 is preferably made by "Slinky" rolling (that is, edgewise) of a sheared strip of this material on the outer surface of the inner drum 72 of the input rotor 20. A heat treatment is then applied to the areas where the permeability needs to be counteracted, particularly in the areas separating adjacent prongs 78 and 84.

Advantageously, such a binding band can have a large thickness compared to a normal non-magnetic binding band, while enabling the magnetic field lines to be guided effectively.

As a variant, the binding band 90 can result from a flat spiral winding of a sheet made of "YEP-FA1". To avoid the generation of nuisance eddy currents, the turns of this winding are electrically insulated from each other and the sheared strip is of small width, designed to limit eddy currents at the frequencies concerned. As in the previous arrangement, the strips of this binding band are demagnetized according to the required pattern. Preferably, a binding wire of high mechanical strength is wound between the turns of this spiral winding in order to improve the effectiveness of the binding band.

According to the invention, the first armature 22 therefore comprises at least one fixed annular coil 52 and magnetic conduction means, part fixed, in other words, the first yoke 60, and part moving, in other words the plates 74 and 76.

The output rotor 30 comprises a disk-shaped support 92, mounted to rotate according to the axis A on the input shaft 12 and in a driving relationship with the output shaft 14 (FIG. 4), and an outer drum 94, having an axis A, fixed to the periphery of the support 92. The outer drum 94, common to the different wafers, is made of a ferromagnetic material, preferably electrically resistive or laminated.

The inner cylindrical surface 96 of the outer drum 94 bears a crown 23 of inner magnets 24 disposed facing the lateral sides 82 and 89 of the prongs 78 and 84.

The inner magnets 24 follow each other with regular spacing, the number of inner magnets 24 being equal to the total number of prongs on the two plates 74 and 76.

An air gap of the first armature 98 or "first air gap 98" separates the inner magnets 24 from the lateral sides 82 and 88 of the prongs 78 and 84.

The geometry of the wafers is designed to take account of the electrical phase difference between the electrical phases supplying their respective first armature windings. For example, in an embodiment where each prong of the wafer G1 is axially aligned with a prong of the wafer G2, the two crowns of inner magnets of these two wafers are angularly offset by an angle corresponding to the electrical phase difference of the two phases.

Conversely, in an embodiment where the two crowns of inner magnets of the wafers G1 and G2 are not offset from each other, each inner magnet of the wafer G1 being axially aligned with an inner magnet of the wafer G2, the two sets of prongs of the two wafers are angularly offset by an angle corresponding to the electrical phase difference of the two phases.

The second electric machine M2 can be produced according to a known architecture. It conventionally comprises a second armature 42, in the form of a second stator 40 fixed to the casing 16, comprising a magnetic circuit 43. The magnetic circuit 43 is an annular external yoke bearing notches open towards the inside. It can also be designated below as "second yoke". The magnetic circuit 43 bears a set of polyphase coils 100. Conventionally, the coils 100 are introduced into the axial peripheral notches 102 provided on the inner surface 104 of the magnetic circuit 43, according to the usual method of producing polyphase machine armatures. The magnetic circuit 43 preferably comprises a stack of magnetic plates.

A second air gap 106 separates the inner surface 104 of the magnetic circuit 43 from a crown 44 of outer magnets 45, regularly spaced apart from each other, and disposed on the outer surface 108 of the outer drum 94.

Preferably, a binding band 110 is produced, for example in the manner of the binding band 90 of the input rotor 20, to improve the fixing of the outer magnets 45 on the outer drum 94.

Figure 7:
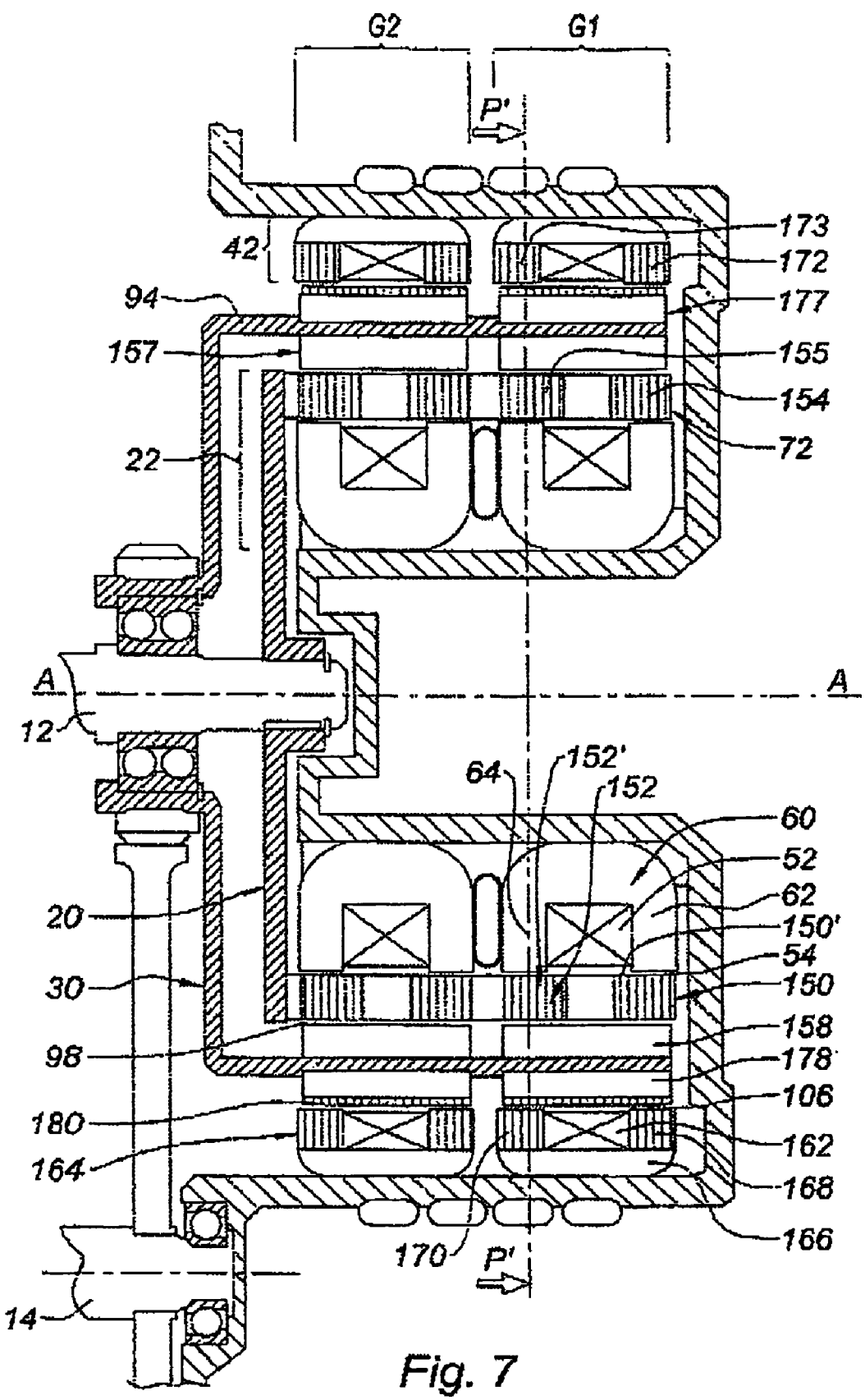
FIGS. 7 and 8 diagrammatically represent, in a two-phase configuration, an electromagnetic coupler of the type represented in FIG. 3, according to a second embodiment of the invention, in cross section in the plane of the drawing in FIG. 3, and in quarter section according to the plane P'-P' of FIG. 7, respectively.
Figure 8:
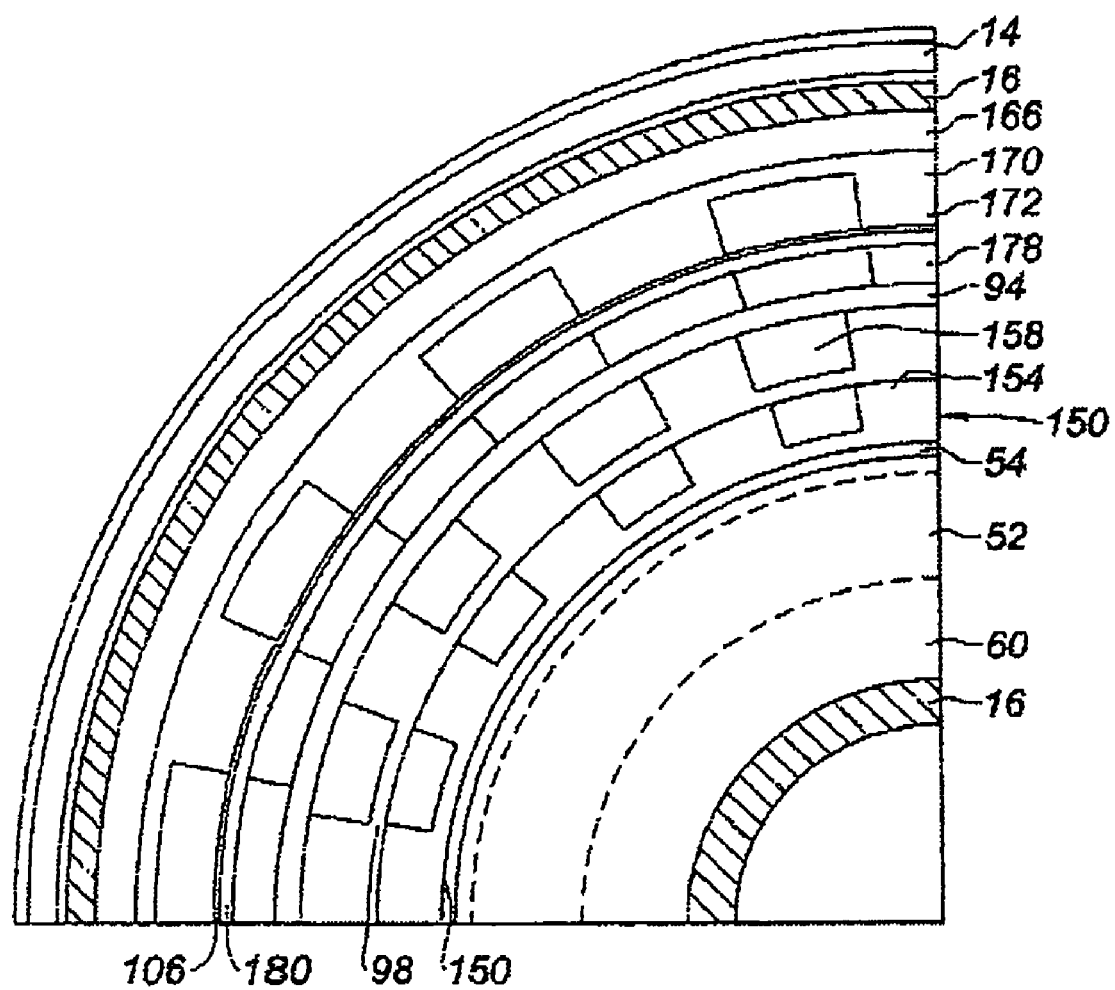

The number of outer magnets 45 can be the same as or different from the number of inner magnets 24. Preferably, the number of outer magnets 45 is equal to the number of inner magnets 24, the magnets 45 and 24 being placed facing each other with the same direction of magnetization. The outer drum 94 can then be of very small thickness, and even be eliminated in favor of a simple non-magnetic crown for securing the magnets that are merged and housed in recesses provided in this crown. This so-called "linking flux" arrangement of the magnets can also be produced with a caged asynchronous rotor with no yoke. It can also be directly transposed to the variant of the invention with variable synchronous reluctance in which the outer drum 94 is provided with ferromagnetic studs, as shown in FIGS. 7 and 8, described below.

To limit the stray magnetic couplings by leaks between adjacent wafers, a decoupling space with no ferromagnetic material is preferably provided between two successive wafers on the first "U"-shaped yokes of the first armature. Preferably, an annular cooling circuit 112 is disposed in this decoupling space.

In an embodiment that is not shown, a decoupling can also be produced on the outer drum 94, typically by an annular magnetic transition having an axis A made of a non-ferromagnetic material. A simple thinning of the drum 94, in the form of an annular groove having an axis A provided between successive wafers, can also prove sufficient. Advantageously, if a decoupling is provided on the drum 94, the two yokes 60 of the two wafers can be attached, with no decoupling space, so optimizing the axial footprint of the electromagnetic coupler.

Cooling means 114 can finally be disposed around the outer periphery of the second stator 40, as shown in FIG. 4.

The operation of the inventive electromagnetic coupler represented in FIGS. 4 and 5 is as follows:

The annular coil 52 is supplied with electrical energy via the first electronic unit 34. The circulation of electric current in the coil 52 produces a magnetic field with field lines that roughly follow the following circuit.

The field lines are oriented roughly along the axis A in the bottom 61 of the "U" of the first yoke 60, then redirected roughly radially in the flanges 62 and 64 of the first yoke 60. They then pass roughly radially through the surfaces 66 and 68 and the additional air gap 54, then penetrate into the plates 74 and 76 via the first and second inner surfaces 82 and 83 respectively. They are then grouped together in first and second prongs 78 and 84 of the plates 74 and 76, respectively. The field lines then follow the roughly axial direction of the prongs 78 and 84, then are straightened to exit, roughly radially, via the outer lateral sides 88 and 89 of these prongs. They then pass through the binding band 90, the first air gap 98, the magnets 24, then the outer drum 94. In the outer drum 94, the field lines originating from the two flanges 62 and 64 are redirected roughly tangentially, in a plane perpendicular to the axis A and are joined up again to form loops.

The magnetic flux circulates along these loops, in one direction or in the other depending on the direction of the electric current circulating in the coil 52. All the outer lateral sides 88 of the first prongs are homopolar. All the outer lateral sides 89 of the second prongs are also homopolar, but with a polarity opposite to that of the outer lateral sides of the first prongs.

The driver unit 36 controls the first electronic unit 34 so as to make an electric current, the frequency of which is suited to requirements, circulate in the coils 52.

In particular, to achieve synchronism, the driver unit 36 supplies the first coil 52 with direct current. The magnetic poles created by the outer sides 88 and 89 of the prongs 78 and 84 then rotate about the axis A only because of the rotation of the input rotor 20.

When the coil 52 and the corresponding coils of the other wafers are supplied with polyphase alternating currents, their assembly overall forms the equivalent of a rotating field: the speed of this rotating field then corresponds to the slip speed between the inner input drum and the output rotor. The product of the torque transmitted by the slip, positive or negative, corresponds to the generation or, respectively, the absorption, of an electromagnetic power.

By adjusting the frequency and the phasing of the electric currents circulating in the coils 52, the driver unit 36 can therefore electrically modify the direction and the slip speed of the output rotor 30 relative to that of the input rotor 20. According to the invention, this speed variation is advantageously possible without rotating the magnetic field source, that is, the coils 52. Supplying electrical power to the coils 52 does not therefore require sliding contact. Furthermore, the cooling of the coils 52 is facilitated and allows for recourse to effective means favoring compactness.

If the electromagnetic coupler has only one first coil 52, the torque transmitted to the output shaft 14 will include a major power component. It is therefore preferable to use at least two wafers with first coils receiving two-phase power, the two phases being electrically offset by 90°. Again preferably, the electromagnetic coupler comprises three wafers, the armatures of which are supplied with a three-phase electric current. The number of wafers is, however, not limiting.

Since the field lines follow a three-dimensional circuit, the use of SMC type materials, in particular for the first yoke 60 and the plates 74 and 76, is particularly advantageous.

The additional air gap 54 induces a stray reluctance, relatively insensitive for implementations with low permeability magnets. Advantageously, a splayed shape of the flanges 62 and 64 towards the surfaces 66 and 68 makes it possible to reduce the stray reluctance without having recourse to prohibitive radial tolerances.

The operation of the second electric machine M2 is conventional, as explained in the introduction. The polyphase power supply of the coils 100 is used to generate a rotating magnetic field driven in synchronism with the output rotor 30. The current level and its phase are used to adjust at will the amplitude and the sign of the torque created by the machine M2 on the output rotor 30.

Naturally, the electrical power produced or consumed by the first machine M1 can be balanced with that respectively consumed or produced by the second machine M2 by adjusting the torque of M2. In these conditions, there is no exchange of power with the battery 32: the mechanical power introduced by the input shaft 12 is transmitted to the shaft 14, except for the losses in the coupler.

Figure 9:
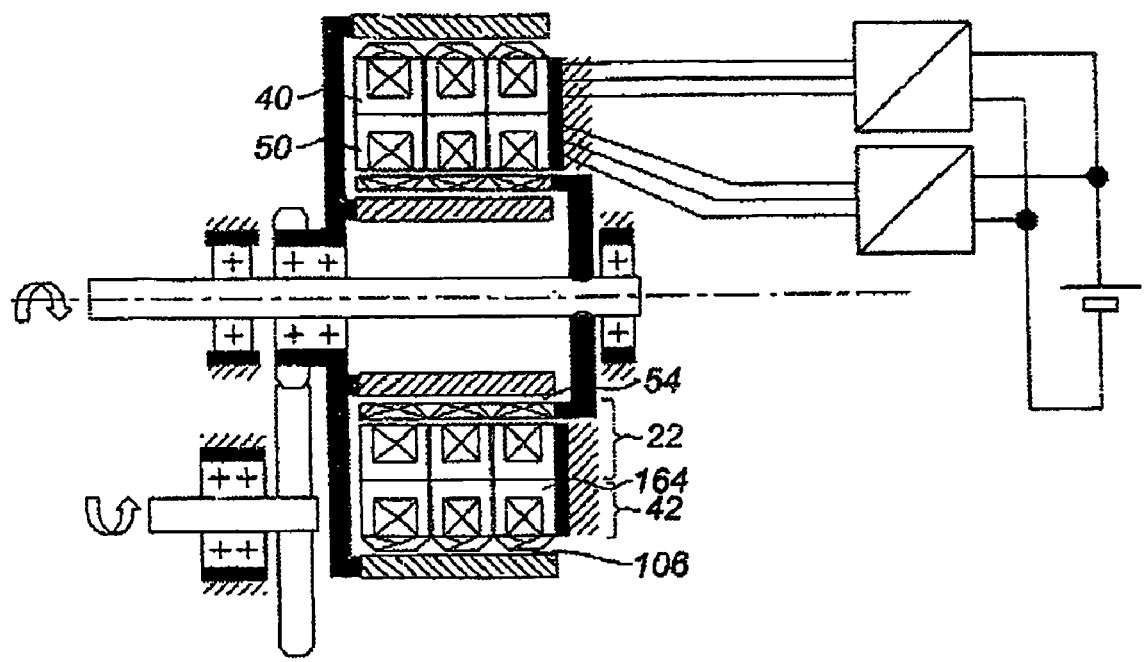
FIGS. 9 and 10 diagrammatically represent two variants of an electromagnetic coupler according to the invention.

In a variant of the second machine M2, diagrammatically represented in a three-phase version in FIG. 9, the second armature can, like the first armature, comprise an annular winding having an axis A, wound about a second annular yoke 164 with a "U"-shaped transverse cross section, the roughly radial two flanges of which are prolonged by first and second sets of prongs, respectively, disposed alternately, without contact between each other, in line with and spaced apart from the second part of the output rotor 30 by the second air gap 106.

Unlike the prongs of the first armature, the prongs of the second armature, used to distribute the magnetic flux in the second air gap 106, are fixed.

FIGS. 7 and 8 represent a second embodiment of the invention exploiting the principle of variable reluctance with dual protuberance both for the first electric machine M1' and for the second machine M2'.

In this second embodiment, the pronged plates 74 and 76 of the first electric machine M1' are replaced by first and second toothed crowns, 150 and 152 respectively, having an axis A, drilled in their centers by first and second holes bounded by first and second inner surfaces, 150' and 152' respectively, axially aligned with the first and second flanges of the first yoke 60, respectively 62 and 64. The first and second inner surfaces, 150' and 152', in line with the first and second flanges, respectively, are spaced apart from them by the additional air gap 54.

The toothed crowns 150 and 152 are provided with first and second sets of radial teeth, 154 and 155. The teeth of each set, identical in number, are spaced at regular intervals. The crowns 150 and 152 are disposed and maintained perpendicular to the axis A by a binder 156, so that each tooth of the crown 150 is axially aligned with a tooth of the crown 152.

The outer drum 94 of the output rotor 30 comprises, instead of the crown of inner magnets 24, an inner crown 157 of magnetic studs 158 made of iron powder, evenly spaced, in numbers equal to the number of teeth of one of the toothed crowns 150 and 152. The teeth of the toothed crowns 150 and 152 are disposed in line with and spaced apart from the inner crown 157 by the first air gap 98.

Each stud 158 extends axially so as to be able to simultaneously cover, at least partly, a tooth of each crown 150 and 152, then forming a magnetically conductive "cradle" between these teeth.

Preferably, the toothed crowns 150 and 152 are formed by stacks of flat sheets perpendicular to the axis A.

In the second embodiment of the invention represented in FIGS. 7 and 8, the magnetic field lines generated by the coil 52 follow the following circuit:

After being output from the flanges of the first yoke 60 and having passed through the first air gap 98, the magnetic field lines pass radially through the teeth of the crowns 150 and 152, then loop axially into the studs 158.

The inner drum 94 supporting the magnetic studs 158 no longer therefore necessarily exercises the magnetic yoke function and can be chosen mainly for its mechanical strength.

The second electric machine M2' comprises an annular coil, or "second coil" 162, having an axis A, wound at the bottom of a second yoke 164 having a U-shaped transverse cross section. The second yoke 164 comprises a bottom 166, preferably made of a composite magnetic material, and first and second yoke flanges, 168 and 170, respectively formed by the two flanges of the "U".

Preferably, the flanges 168 and 170 are formed by stacks, according to the axis A, of sheets extending perpendicularly to the axis A.

The flanges 168 and 170 extend roughly perpendicularly to the axis A and present, in cross section according to a plane perpendicular to the axis A (FIG. 8), an evenly crenellated profile. The crenellations of the flanges 168 and 170 form first and second sets of teeth, 172 and 173 respectively, and comprise equal numbers of teeth, each first tooth 172 being axially aligned with a second tooth 173.

Preferably, the teeth 172 and 173 are formed, at least partly, over the height of the winding 162. Advantageously, the footprint of the second machine M2' is reduced.

The outer drum 94 of the output rotor 30 comprises, instead of the crown 44 of outer magnets 45, an outer crown 177 of magnetic studs 178, preferably made of iron powder, spaced at regular intervals, in numbers equal to the number of teeth of each of the flanges 168 and 170. Each stud 178 extends axially so as to be able to simultaneously cover, at least partly, a tooth 172 of each flange 168 and 170.

The second air gap 106 separates the outer crown 177 and the flanges 168 and 170.

Preferably, a binding band 180, preferably made of a demagnetizable material, is provided to externally circle the magnetic studs 178.

The studs 158 and 178 can be formed simply by clusters of sheets.

The electromagnetic coupler according to the invention as shown in FIGS. 7 and 8 therefore has a configuration with variable reluctance and dual protuberance with transverse looping of the flux via a non-wound output rotor.

Advantageously, such an electromagnetic coupler is less expensive to manufacture than that shown in FIGS. 4 and 5, particularly because the outer drum 94 is no longer necessarily made of a magnetically conductive material. The thickness of the outer drum 94 between the studs 158 and 178 can be reduced, even eliminated by placing these studs in contact, which, advantageously, confers an additional compactness on the electromagnetic coupler.

The operation of the first machine M1' is similar to that of the first machine M1 of the electromagnetic coupler shown in FIGS. 4 and 5. The operation of the second machine M2' is similar to that of the first machine M1'.

The annular winding of the first and/or second coils favors the limiting of Joule losses, which represent most of the losses of the coupler when it is operating near synchronism, as it does frequently. This benefit arises mainly from the circular geometry which reduces the average turn length of the windings, from a favorable effect of structures with centralized armature and also from the facility to obtain a high filling coefficient. The filling coefficient designates the ratio between the volume of copper inside the groove of the yoke and the volume of this groove.

Advantageously, limiting the Joule losses is also a way of limiting the capacity of the means needed to cool the electromagnetic coupler.

Finally, advantageously, it is very simple and inexpensive to manufacture and fit annular windings.

Of course, the present invention is not limited to the embodiments described and represented, provided by way of illustrative and non-limiting examples.

In particular, the position of the input and output shafts, the lowering of movement towards the output shaft 14 represented in FIGS. 1, 2 and 3, the shape of the prongs or the studs, the number of electrical phases, and the number of wafers per phase are not limiting.

The relative position of the input and output rotors can be reversed, the input rotor becoming outer and the output rotor becoming inner.

A combination of the first machine M1 and of the second machine M2', or a combination of the second machine M2 and of the first machine M1', are possible.

The structure with centralized armature with additional air gap can be applied to various known principles. It is possible, for example, to introduce, instead of the crown 23 of magnets 24, an asynchronous cage. The structure of the second electrical machine is also nonlimiting: asynchronous, variable reluctance, etc.

The input 20 and output 30 rotors are not necessarily disposed in the same transverse plane, but can be axially offset.

Preferably, however, the input 20 and output 30 rotors are inserted into each other, the output rotor 30 being, for example, disposed around the input rotor 20. Advantageously, this arrangement confers a good compactness on the electromagnetic coupler.

Similarly, the geometry of the air gaps of the electromagnetic couplers represented is not limiting. The air gaps could extend not only according to a cylinder having an axis A (so-called "radial" configuration of the air gaps), but in a plane perpendicular to the axis A (so-called "axial" configuration of the air gaps), even according to other combined configurations. An axial configuration advantageously makes it possible to obtain large area air gaps, subject to ease of assembly and balancing of the axial forces.

The relative position of the armatures in relation to their respective air gaps can also be different from that described. A variant of particular interest is illustrated in FIG. 9. The position of the armatures relative to their air gaps is reversed compared to that which they occupy in the variants represented in FIGS. 1 to 8. The first armature 22 has become external relative to the first air gap 54, whereas the second armature 42 is internal relative to the second air gap 106.

Consequently, the magnetic circuits corresponding to these air gaps are geometrically disassociated, one inside the machine, the other outside.

Advantageously, the first and second stators, 50 and 40 respectively, can thus be attached. Their mechanical integration is simplified and the cooling circuit is simplified.

Figure 10:
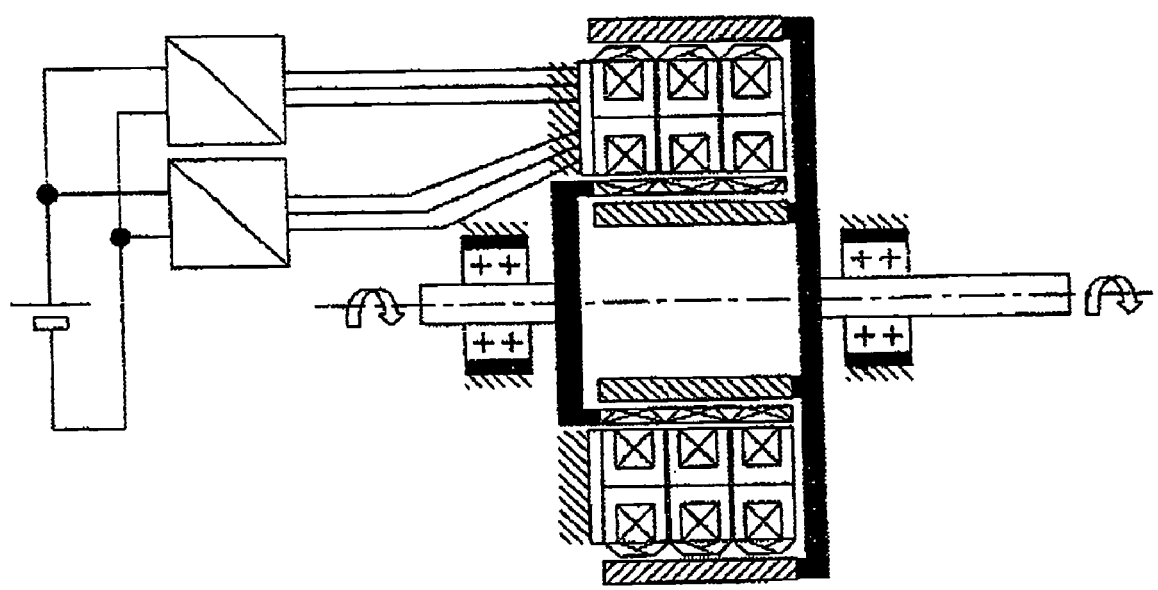

Again advantageously, as shown in FIG. 10, this variant provides for a movement output positioned on the side opposite to the motive source relative to the electromagnetic coupler.

Of course, the application of the invention is not limited to the transmission of power between an engine and the wheels of a motor vehicle.

The input shaft can be driven directly or indirectly. The input and output shafts can have their roles reversed.

The invention claimed is:

1. An electromagnetic coupler, comprising:
   a first electric machine comprising a first stator having an axis bearing at least one first coil wound on an annular first fixed yoke having an axis and a U-shaped transverse cross section, and configured to be coupled by magnetic induction with a first part of an output rotor mobile rotation-wise about the axis relative to the first stator, the coupling being provided via an inner drum, mobile rotation-wise about the axis relative to the first stator and to the first part and spaced apart from the first part and from the first yoke by an additional air gap and a first air gap, respectively;
   a second electric machine having an axis and comprising a second stator bearing at least one second coil wound on a second yoke, and configured to be coupled by magnetic induction with a second part of the output rotor via a second air gap; and
   an electronic unit configured to supply alternating current to the first coil,
   wherein the first coil is wound on the first yoke about the axis of the first stator.

2. The electromagnetic coupler as claimed in claim 1, wherein the at least one second coil is annular and is wound about the axis of the second electric machine.

3. The electromagnetic coupler as claimed in claim 2, wherein the second yoke is roughly annular having an axis and has a U-shaped transverse cross section, first and second flanges of the second yoke being extended by first and second sets of prongs, respectively, disposed alternately, not in contact with each other, in line with and spaced apart from the second part of the output rotor by the second air gap.

4. The electromagnetic coupler as claimed in claim 1, wherein the second part of the output rotor comprises a crown of outer magnets in line with and spaced apart from the second yoke by the second air gap.

5. The electromagnetic coupler as claimed in claim 1, wherein the output rotor is disposed around an input rotor.

6. The electromagnetic coupler as claimed in claim 1, further comprising an input rotor at least partly covered by a binding band made of a magnetic material of type Fe-17.5Cr-0.5C.

7. The electromagnetic coupler as claimed in claim 6, wherein the binding band is produced by edge rolling a sheared strip of the magnetic material or by flat spiral winding a sheet of the magnetic material, turns of the winding being electrically insulated from each other.

8. The electromagnetic coupler as claimed in claim 1, further comprising first and second adjacent wafers, each comprising the at least one first coil wound about the axis of the first stator, on a first fixed yoke, the first yokes of the first and second wafers being separated by a magnetic decoupling space.

9. The electromagnetic coupler as claimed in claim 8, further comprising a cooling circuit disposed in the decoupling space.

10. The electromagnetic coupler as claimed in claim 1, wherein first and second flanges of the first yoke are terminated by first and second surfaces spaced apart from the inner drum by the first air gap.

11. The electromagnetic coupler as claimed in claim 10, wherein the inner drum comprises first and second coaxial plates of the axis of the first stator, drilled in their centers by first and second holes bounded by first and second inner surfaces, respectively, and bearing first and second sets of prongs extending around a periphery of the first and second plates, respectively, the first and second plates being modeled and arranged relative to each other so that the prongs of the first and second plates are disposed alternately, not in contact with each other, in line with and spaced apart from the first part of the output rotor, the first and second inner surfaces being in line with and spaced apart from the first and second flanges of the first yoke, respectively.

12. The electromagnetic coupler as claimed in claim 11, wherein the first part of the output rotor comprises a crown of inner magnets, radially magnetized, with alternate polarities, and disposed in line with and spaced apart from the prongs.

13. The electromagnetic coupler as claimed in claim 12, wherein the second part of the output rotor comprises a crown of outer magnets in line with and spaced apart from the second yoke by the second air gap, and a number of the outer magnets is equal to a number of the inner magnets, the outer and inner magnets being disposed with a same direction of magnetization.

14. The electromagnetic coupler as claimed in claim 11, further comprising an input rotor at least partly covered by a binding band made of magnetic material of type Fe-17.5Cr-0.5C, and the binding band presents, above an area separating two adjacent prongs, an electromagnetic permeability less than that which the binding band presents above the adjacent prongs.

15. The electromagnetic coupler as claimed in claim 11, wherein at least one item selected from a group comprising the first yoke, the first plate, and the second plate is made of a composite magnetic material of iron powder, or soft magnetic composites.

16. The electromagnetic coupler as claimed in claim 10, wherein the inner drum comprises first and second toothed crowns, coaxial with the axis of the first stator, drilled in their centers by first and second holes bounded by first and second inner surfaces, respectively, and bearing first and second sets of teeth, respectively, the first and second toothed crowns being modeled and arranged relative to each other so that the teeth of the first and second toothed crowns are disposed in line with and spaced apart from the first part of the output rotor, the first and second inner surfaces being in line with and spaced apart from the first and second flanges of the first yoke, respectively.

17. The electromagnetic coupler as claimed in claim 16, wherein the first part of the output rotor comprises an inner crown of magnetic studs in line with and spaced apart from the teeth.

18. The electromagnetic coupler as claimed in claim 17, wherein the inner crown comprises as many of the magnetic studs as the first toothed crown or the second toothed crown has of the teeth.

19. The electromagnetic coupler as claimed in claim 18, wherein the magnetic studs extend axially so as to be able to simultaneously cover, at least partly, a tooth of each of the first and second toothed crowns.

20. An electromagnetic coupler, comprising:
a first electric machine comprising a first stator having an axis bearing at least one first coil wound on a first fixed yoke, and configured to be coupled by magnetic induction with a first part of an output rotor mobile rotationwise about the axis relative to the first stator, the coupling being provided via an inner drum, mobile rotationwise about the axis relative to the first stator and to the first part and spaced apart from the first part and from the first yoke by an additional air gap and a first air gap, respectively;
a second electric machine having an axis and comprising a second stator bearing at least one second coil wound on a second yoke, and configured to be coupled by magnetic induction with a second part of the output rotor via a second air gap; and
an electronic unit configured to supply alternating current to the first coil,
wherein the first coil is wound on the first yoke about the axis of the first stator,
wherein the second yoke is roughly annular having an axis and has a U-shaped transverse cross section in which first and second flanges have a regularly crenellated profile.

21. The electromagnetic coupler as claimed in claim 20, wherein the second part of the output rotor comprises an outer crown of magnetic studs, in line with and spaced apart from the first and second flanges of the second yoke by the second air gap.

22. An electromagnetic coupler, comprising:
a first electric machine comprising a first stator having an axis bearing at least one first coil wound on a first fixed yoke, and configured to be coupled by magnetic induction with a first part of an output rotor mobile rotationwise about the axis relative to the first stator, the coupling being provided via an inner drum, mobile rotationwise about the axis relative to the first stator and to the first part and spaced apart from the first part and from the first yoke by an additional air gap and a first air gap, respectively;
a second electric machine having an axis and comprising a second stator bearing at least one second coil wound on a second yoke, and configured to be coupled by magnetic induction with a second part of the output rotor via a second air gap; and an electronic unit configured to supply alternating current to the first coil, wherein the first coil is wound on the first yoke about the axis of the first stator, the first electric machine and the second electric machine comprise first and second adjacent wafers, and the output rotor comprises a magnetic decoupling space disposed between the first and second wafers, in a plane roughly perpendicular to the axis of the first stator.

* * * * *